(12) United States Patent
Ishida et al.

(10) Patent No.: US 9,129,203 B2
(45) Date of Patent: Sep. 8, 2015

(54) RFID TAG, METHOD FOR PRODUCING RFID TAG, AND MOLD

(75) Inventors: Fumihito Ishida, Chikuma (JP); Masao Nishizawa, Chikuma (JP); Kenji Kida, Chikuma (JP); Tadahiko Hirano, Hokuto (JP)

(73) Assignee: APIC YAMADA CORPORATION, Nagano-Ken (JP)

( * ) Notice: Subject to any disclaimer, the term of this patent is extended or adjusted under 35 U.S.C. 154(b) by 14 days.

(21) Appl. No.: 14/345,919

(22) PCT Filed: Sep. 6, 2012

(86) PCT No.: PCT/JP2012/005643
§ 371 (c)(1),
(2), (4) Date: May 20, 2014

(87) PCT Pub. No.: WO2013/057868
PCT Pub. Date: Apr. 25, 2013

(65) Prior Publication Data
US 2014/0326791 A1 Nov. 6, 2014

(30) Foreign Application Priority Data
Oct. 18, 2011 (JP) .................................. 2011-228944

(51) Int. Cl.
*G06K 19/07* (2006.01)
*G06K 19/077* (2006.01)
(Continued)

(52) U.S. Cl.
CPC .......... *G06K 19/07783* (2013.01); *B29C 45/14* (2013.01); *G06K 19/027* (2013.01); *G06K 19/0723* (2013.01); *G06K 19/07724* (2013.01);
(Continued)

(58) Field of Classification Search
CPC .................. G06K 19/07728; G06K 19/07779; G06K 19/0723
USPC ...................... 235/492, 486; 340/572.1, 572.7
See application file for complete search history.

(56) References Cited

U.S. PATENT DOCUMENTS 7,868,766 B2 *  1/2011  Gengel et al. ............... 340/572.7
2005/0078050 A1 *  4/2005  Aisenbrey ..................... 343/895
(Continued)

FOREIGN PATENT DOCUMENTS

GB        2448122       10/2008
JP      2000-322548    11/2000
(Continued)

OTHER PUBLICATIONS

International Preliminary Report on Patentability issued Apr. 22, 2014 for International Application PCT/JP2012/005643.
(Continued)

*Primary Examiner* — Allyson Trail
(74) *Attorney, Agent, or Firm* — N W Poulsen; A M Seralathan

(57) ABSTRACT

An RFID tag is provided which does not give a user a feeling of strangeness even when contacting his/her body and is firmly attachable to a fabric such as clothes. The RFID tag is for wireless communications and includes a main antenna 30 formed by a conductive fiber, a loop antenna 12 electrically coupled to the main antenna 30 without direct conductive connection, a semiconductor device 20 electrically connected to a terminal 16 of the loop antenna 12, and a resin 28 collectively sealing the main antenna 30, the loop antenna 12, and the semiconductor device 20.

20 Claims, 18 Drawing Sheets

(51) Int. Cl.
  *G06K 19/02* (2006.01)
  *H01Q 1/27* (2006.01)
  *H01Q 1/44* (2006.01)
  *B29C 45/14* (2006.01)
  *H01Q 1/22* (2006.01)
  *H01Q 7/00* (2006.01)

(52) U.S. Cl.
  CPC .... *G06K 19/07756* (2013.01); *G06K 19/07794* (2013.01); *H01Q 1/273* (2013.01); *H01Q 1/44* (2013.01); *H01Q 1/2225* (2013.01); *H01Q 7/00* (2013.01); *Y10T 29/41* (2015.01)

(56) References Cited

U.S. PATENT DOCUMENTS

| | | | |
|---|---|---|---|
| 2006/0181422 A1* | 8/2006 | Chen et al. | 340/572.7 |
| 2007/0194135 A1* | 8/2007 | Inoue et al. | 235/492 |
| 2009/0100575 A1* | 4/2009 | Darnborough | 2/244 |
| 2010/0194661 A1* | 8/2010 | Harokopus et al. | 343/872 |
| 2011/0102279 A1* | 5/2011 | Immonen et al. | 343/720 |
| 2011/0253793 A1* | 10/2011 | King | 235/492 |
| 2012/0213885 A1* | 8/2012 | Nishizawa et al. | 425/588 |

FOREIGN PATENT DOCUMENTS

| | | |
|---|---|---|
| JP | 2009-289003 | 12/2009 |
| JP | 2010-204744 | 9/2010 |
| JP | 2011-015395 | 1/2011 |

OTHER PUBLICATIONS

International Preliminary Report on Patentability and Written Opinion of the International Searching Authority mailed Oct. 9, 2012 for International Application PCT/JP2012/005643.

"RFID by Using Fabric Antenna", The Institute of Electronics, Information and Communication Engineer, Sogo Taikai Koen Ronbunshu Tushin 1, Masato Tanaka, Mar. 8, 2006, ppg B-1-173, ISSN 1349-1369. (English translation included).

International Search Report and Written Opinion issued for international application No. PCT/JP2012/005643, mailed on Oct. 9, 2012.

* cited by examiner

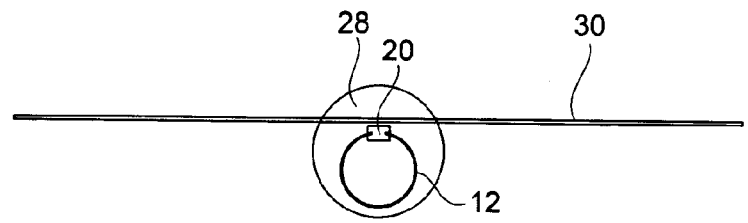
FIG. 4A
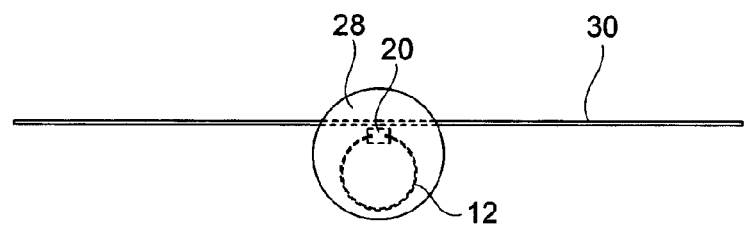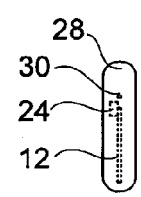
FIG. 4B  FIG. 4D
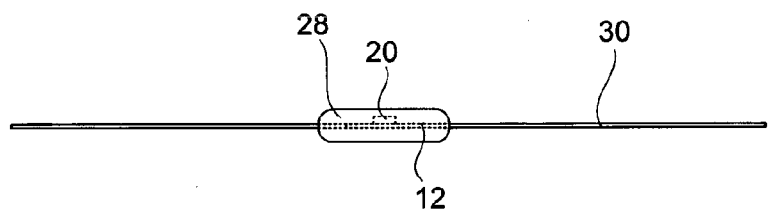
FIG. 4C
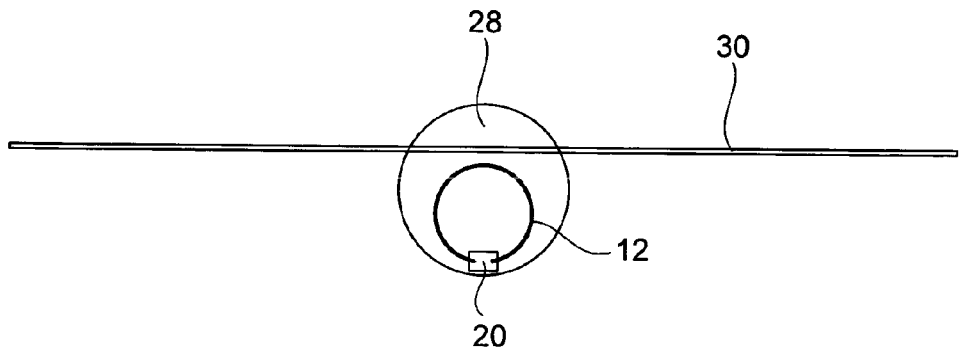
FIG. 5

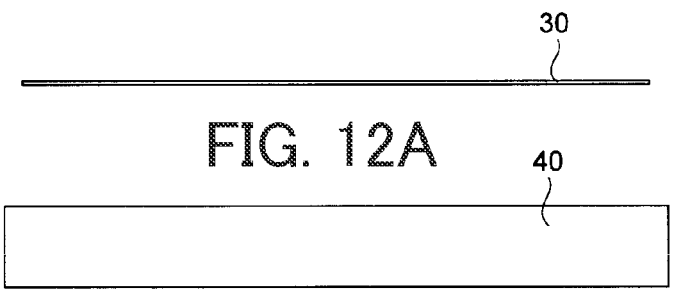
FIG. 12A
FIG. 12B
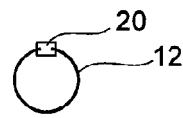
FIG. 12C
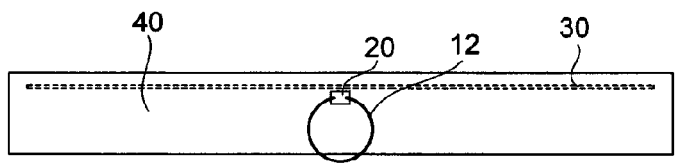
FIG. 12D
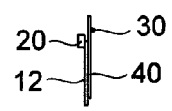
FIG. 12E
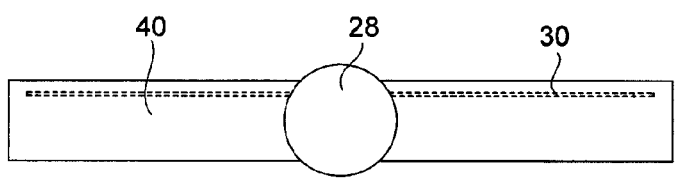
FIG. 12F
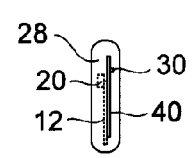
FIG. 12H
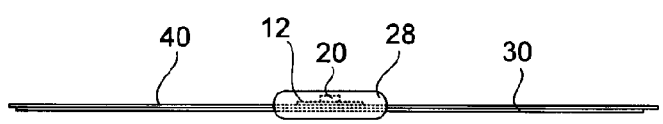
FIG. 12G

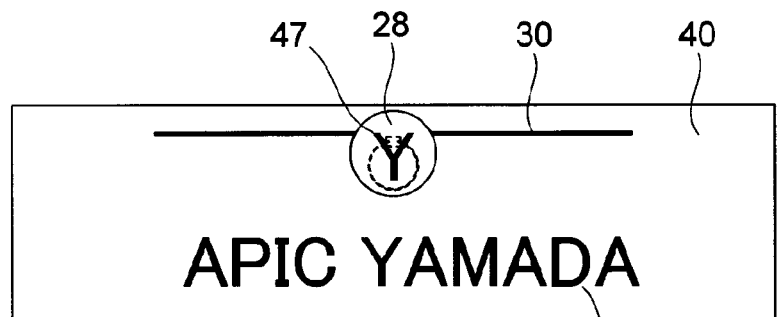
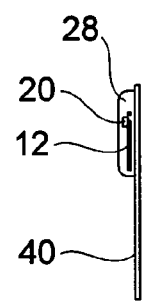
FIG. 13A  FIG. 13B
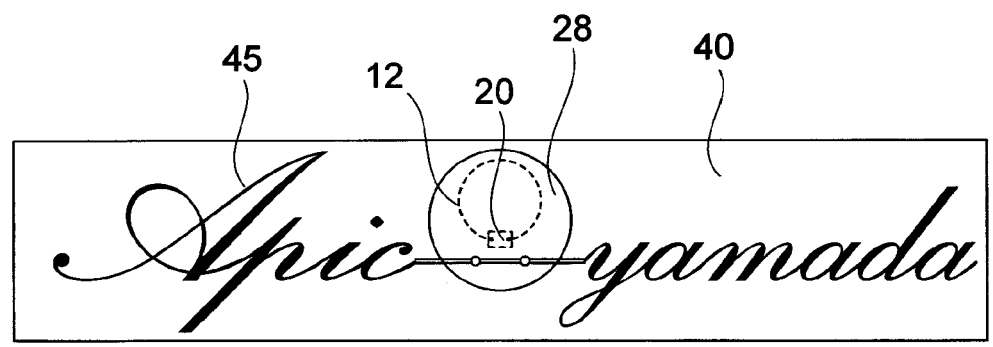
FIG. 14

RFID TAG, METHOD FOR PRODUCING RFID TAG, AND MOLD

CLAIM FOR PRIORITY

This application is a National Stage Entry of and claims priority under 35 U.S.C. §§365 and 371 to PCT application serial no. PCT/JP2012/005643, filed Sep. 6, 2012 and entitled "RFID TAG, METHOD FOR PRODUCING RFID TAG, AND DIE," which in turn claims priority to Japanese patent application serial no. 2011-228944, filed Oct. 18, 2011 and entitled "Flip-Flop Circuit." The entire contents of the aforementioned applications are herein expressly incorporated by reference.

TECHNICAL FIELD

The present invention relates to an RFID tag including a main antenna formed by a conductive fiber, a method of manufacturing the RFID tag, and a mold which is used for manufacturing the RFID tag.

BACKGROUND

Conventionally, an RFID tag has been generally configured by forming an antenna wire (a metal antenna) with a metal foil on a plastic film and mounting an IC chip on the antenna wire. However, the use of such an RFID tag on a fabric such as clothes often gives a user a feeling of strangeness due to contact between skin and the plastic film. Moreover, the metal antenna or the IC chip which is included in the RFID tag may be destroyed because of the fragility under hard washing and spinning conditions such as those observed in the case of linen.

In recent years, a structure of an RFID tag using a conductive fiber has been proposed. For instance, PTL 1 discloses an RFID tag which includes a tag IC chip storing tag information and a tag antenna portion electrically connected to the tag IC chip. The tag antenna portion has an end portion which is formed by a conductive carbon fiber cord and is electrically connected to the tag IC chip.

CITATION LIST

Patent Literature

[PTL 1] Japanese Patent Laid-Open No. 2009-289003

SUMMARY OF INVENTION

Technical Problem

However, in the configuration disclosed in PTL 1, the tag antenna portion formed by the conductive carbon fiber cord is electrically connected to the IC chip. This may result in the destruction of the IC chip due to static electricity.

Thus, the present invention provides a highly-reliable RFID tag which does not give a user a feeling of strangeness even when contacting his/her body and is firmly attachable to a fabric such as clothes, a method of manufacturing the RFID tag, and a mold which is used for manufacturing the RFID tag.

Solution to Problem

An RFID tag as one aspect of the present invention is an RFID tag for wireless communications and includes a main antenna formed by a conductive fiber, a loop antenna formed by a sheet metal and electrically coupled to the main antenna without direct conductive connection, a semiconductor device electrically connected to a terminal of the loop antenna, and a resin collectively sealing a part of the main antenna, the loop antenna, and the semiconductor device.

A method of manufacturing an RFID tag for wireless communications as another aspect of the present invention includes the steps of forming a loop antenna by a sheet metal, mounting a semiconductor device on a terminal of the loop antenna to be electrically connected, arranging a main antenna and the loop antenna so that the main antenna formed by a conductive fiber is electrically coupled to the loop antenna without electrical conduction, and sealing a part of the main antenna, the loop antenna, and the semiconductor device collectively with a resin.

A method of manufacturing an RFID tag for wireless communications as another aspect of the present invention includes the steps of forming a loop antenna by a sheet metal, mounting a semiconductor device on a terminal of the loop antenna to be electrically connected, sealing the loop antenna and the semiconductor device collectively with a resin while forming a through-hole, and passing a conductive fiber through the through-hole to fix the resin on a fabric so as to form a main antenna electrically coupled to the loop antenna without direct conductive connection.

A mold as another aspect of the present invention is a mold which is used for manufacturing an RFID tag and includes a first mold configured to press a main antenna formed by a conductive fiber and a loop antenna formed by a sheet metal and mounting a semiconductor device from a first surface side, and a second mold configured to press the main antenna and the loop antenna from a second surface opposite to the first surface, each of the first mold and the second mold includes a cavity and is used to clamp the main antenna and the loop antenna to perform injection molding of a resin inside the cavity, at least one of the cavities of the first mold and the second mold is provided with a movable portion that aligns a part of the main antenna with the loop antenna and that supports the part of the main antenna and the loop antenna, and the movable portion is configured to move depending on an amount of the resin filled inside the cavity.

Further objects and features of the present invention will be described in the following embodiments.

Advantageous Effects of Invention

The present invention is capable of providing a highly-reliable RFID tag which does not give a user a feeling of strangeness even when contacting his/her body and is firmly attachable to a fabric such as clothes, a method of manufacturing the RFID tag, and a mold which is used for manufacturing the RFID tag.

BRIEF DESCRIPTION OF DRAWINGS

FIGS. 4A to 4D are configuration diagrams of an RFID tag in a second embodiment.

FIG. 5 is a modification of the RFID tag in the second embodiment.

FIGS. 12A to 12H are configuration diagrams of an RFID tag in a sixth embodiment.

FIGS. 13A and 13B are a modification of the RFID tag in the sixth embodiment.

FIG. 14 is another modification of the RFID tag in the sixth embodiment.

DESCRIPTION OF EMBODIMENTS

Figure 1A:
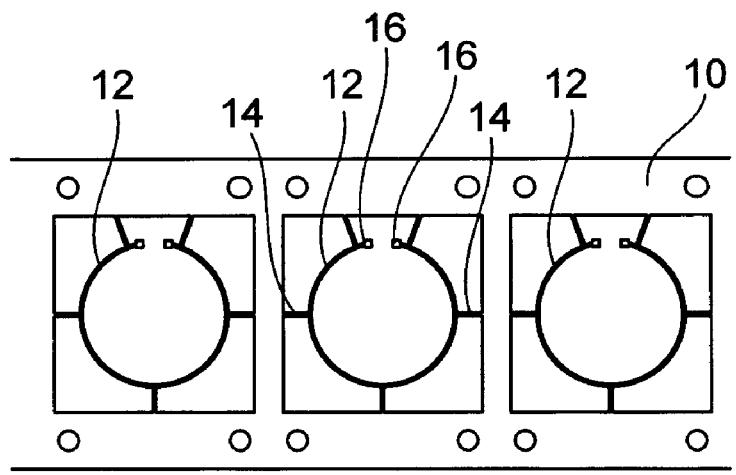
FIGS. 1A to 1C are manufacturing process diagrams of an RFID tag in a first embodiment.

Exemplary embodiments of the present invention will be described below with reference to the accompanied drawings. In each of the drawings, the same elements will be denoted by the same reference numerals and the duplicate descriptions thereof will be omitted.

First Embodiment

First of all, referring to FIGS. 1A to 1C and 2A to 2H, an RFID tag (Radio Frequency Identification Tag) and a method of manufacturing the RFID tag in the first embodiment of the present invention will be described. FIGS. 1A to 1C and 2A to 2H are manufacturing process diagrams of the RFID tag in this embodiment.

FIG. 1A illustrates a plan view of a metal strip 10 (not mounted on a semiconductor device) which is used for the RFID tag of this embodiment. The metal strip 10 is made of, for example a copper or ferrous sheet metal having a thickness of approximately 0.15 mm and is formed by stamping (pressing) or etching. The metal strip 10 includes loop antennas 12 (including micro loop antennas) each serving as an antenna of the RFID for wireless communications and terminals 16 configured to mount the semiconductor device, which is described later, to be electrically connected. Each loop antenna 12 is held by connecting portions 14. The configuration of each of the loop antennas 12 and the terminals 16 in this embodiment, however, is not limited to that illustrated in FIG. 1A.

While the loop antenna 12 of this embodiment is held inside the metal strip, applicable configurations are not limited to this configuration. The loop antenna 12 may be formed, for example, by a conductive fiber, as in the case of a main antenna 30 which is described later, by a hybrid configuration of a metal piece and a conductive fiber, or by a metal coil or an edgewise coil (a coil loop).

Figure 1B:
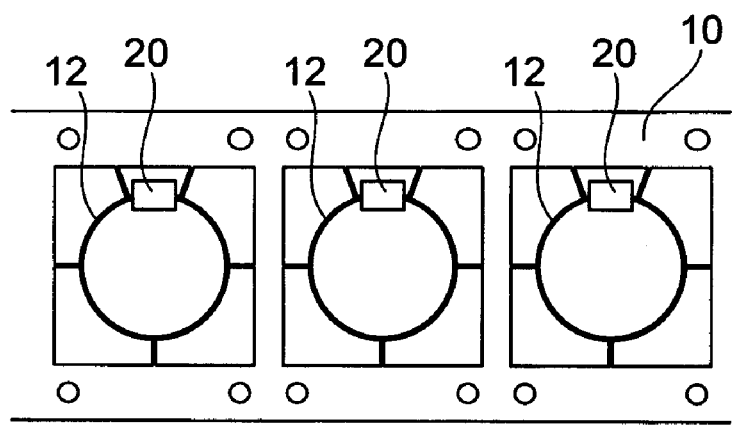

Subsequently, as illustrated in FIG. 1B, each semiconductor device 20 is mounted on corresponding terminals 16 of the metal strip 10. FIG. 1B is a plan view of the metal strip 10 on which the semiconductor device is mounted. Each semiconductor device 20 is mounted on the corresponding terminals 16 of the metal strip 10 and is electrically connected to the corresponding loop antenna 12 (the corresponding terminals 16) by soldering. In this embodiment, each semiconductor device 20 is a semiconductor chip (a bare chip) which is not packaged with a resin. While, in this embodiment, each semiconductor device 20 which is the bare chip is electrically connected to the corresponding terminals 16 by a flip-chip bonding, applicable configurations are not limited to this and thus each semiconductor device 20 may be configured, for example, to be electrically connected to the corresponding terminals 16 by a die bonding between its one terminal and the chip and by a wire bonding between the other terminal and the chip. Alternatively, it may be electrically connected by soldering, welding, or caulking.

As each semiconductor device 20, a semiconductor package (an IC package) configured by sealing a bare chip with a resin may also be used. In this case, preferably, a surface-mounted semiconductor package is used. The use of the semiconductor package as each semiconductor device 20 offers the following advantages. For instance, the RFID tag is not required to be manufactured in a clean room, enabling the production of the RFID tag with lower cost. In addition, a semiconductor device including conforming components can only be selected as each semiconductor device 20 to be mounted on the corresponding terminals 16 (loop terminals). Furthermore, surface treatment such as coating is not required to be applied to the terminals 16.

Figure 1C:
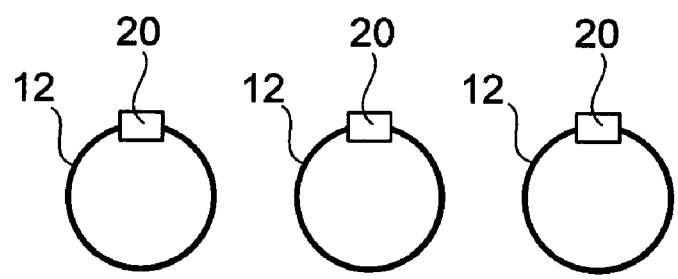
Figure 2A:
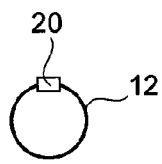
FIGS. 2A to 2H are manufacturing process diagrams of the RFID tag in the first embodiment.
Figure 2E:

Subsequently, as illustrated in FIG. 1C, the metal strip 10 is cut at the connecting portions 14 so that the loop antennas 12 are individually separated. FIG. 1C illustrates a plan view of the loop antennas 12 on which the corresponding semiconductor devices 20 are mounted after the loop antennas 12 are individually separated. FIG. 2A is a plan view of one of the three loop antennas 12 illustrated in FIG. 1C, and FIG. 2E is a side view of FIG. 2A. As illustrated in FIGS. 2A and 2E, the semiconductor device 20 is mounted on the loop antenna 12. As described later, the loop antenna 12 is electrically coupled (electromagnetically coupled) to the main antenna 30 without electrical conduction. While, in this embodiment, the connecting portions 14 of the metal strip 10 are cut to individually separate each loop antenna 12 and then sealed with the resin (a primary molding), the resin sealing may be performed before the connecting portions 14 are cut (before the loop antennas 12 are individually separated).

Figure 2B:
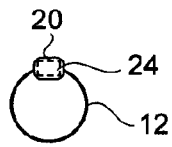
Figure 2F:
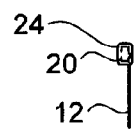

Subsequently, as illustrated in the plan view of FIG. 2B and the side view of FIG. 2F, the semiconductor device 20 (the bare chip) is sealed with a resin 24 (a primary molding resin). The resin 24 is a thermosetting resin such as an epoxy resin, which seals (covers) at least the semiconductor device 20, the solder, and the terminals 16 which are mounted on the metal strip 10. The protection of the semiconductor device 20 as the IC chip by using the resin 24 in such a manner makes it possible to effectively enhance the strength. In this embodiment, the primary molding with the resin 24 is performed by potting molding. This embodiment, however, is not limited to this and thus the resin sealing may be performed also by transfer molding or compression molding.

Since a resin 28 (a thermoplastic resin) used in a secondary molding, which is described later, has a melting temperature of 200 to 300 degrees Celsius and thus the joint of the solder is likely to be destroyed during the secondary molding, it is desirable that a lead-free solder which has a high melting point is used. On the other hand, since the melting temperature of the resin 24 (the thermosetting resin) is approximately 160 degrees Celsius, it does not reach the melting temperature of the solder. Therefore, the solder can be prevented from melting during the resin sealing (the secondary molding) with the use of the resin 28 (the thermoplastic resin), which is described later, by performing the primary molding with the use of the resin 24. In addition, the resin sealing using the thermoplastic resin has a higher injection pressure than that of the thermosetting resin. Thus, the destruction of the joint between the semiconductor device 20 and the metal strip 10 (the terminals 16) can be prevented by performing the primary molding. Furthermore, it is typically difficult to fill a thermoplastic resin in a small clearance of 0.3 mm or less. Therefore, a hollow (air accumulation) is likely to easily occur near the solder joint between the semiconductor device 20 and the metal strip 10. The presence of such a hollow causes the expansion or the contraction of air due to a temperature change, which may lead to the destruction of the solder joint. On the other hand, a thermoplastic resin can be filled, for example, in a small clearance of several micrometers.

As described above, the primary molding using the resin 24 (the thermosetting resin) is performed in order to protect the joint (the solder) between the semiconductor device 20 and the metal strip 10 from heat, injection pressure, and the like during the secondary molding which is described later. While, in this embodiment, an epoxy resin, for example, is used as the resin 24, applicable materials are not limited to this and thus a phenol resin, a silicone resin, or the like may also be used. In addition, instead of covering the entire part of the semiconductor device 20 with the resin 24, an FC connection or underfill molding may also be applied only to a clearance between the semiconductor device 20 and the metal strip 10 (the terminals 16). While, in this embodiment, the thermosetting resin is used as the resin 24 (the primary molding resin), a thermoplastic resin may be used when the reliability of the solder joint is ensured.

Figure 2C:
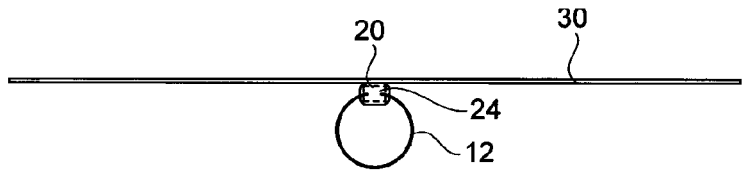
Figure 2G:
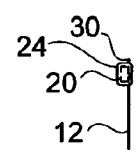

Subsequently, as illustrated in the plan view of FIG. 2C and the side view of FIG. 2G, the main antenna 30 formed by a conductive fiber is arranged near the loop antenna 12. The conductive fiber is, for example, a metal fine fiber such as SUS and copper, a metal fine fiber configured by coating the SUS, the copper, or the like with an organic substance, a fiber containing conductive filler, a metal-coated fiber, or a conductive organic polymer fiber, but not limited to these. As the conductive fiber in this embodiment, a stranded wire is used. The use of the stranded wire makes it possible to effectively prevent the conductive fiber sealed with the resin from coming off. This embodiment, however, is not limited to this and a single wire may be used as the conductive fiber.

As described above, since, in this embodiment, the main antenna 30 is formed by using the conductive fiber, it can be easily attached to a fabric such as clothes. Moreover, the use of a conductive fiber string allows the main antenna 30 to be formed into a desired shape by sewing, making the main antenna 30 applicable also to a three-dimensional antenna such as a helical antenna without its shape being limited to a line shape. Conventionally, the antenna of an RFID tag has been coated by a film, a resin, or the like taking environmental durability into consideration, which may cause a radio wave loss preventing communication in a long distance. On the other hand, the radio wave loss can be reduced with low cost by exposing the conductive fiber as in the case of this embodiment.

Figure 2D:
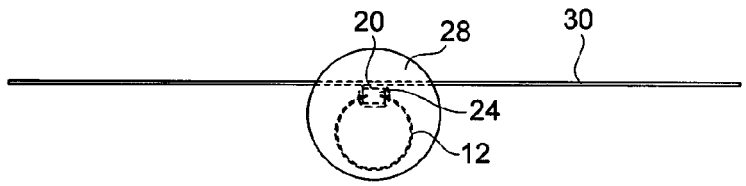
Figure 2H:
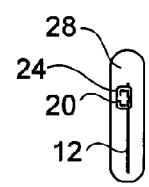

Subsequently, as illustrated in the plan view of FIG. 2D and the side view of FIG. 2H, both the loop antenna 12 on which the semiconductor device 20 sealed with the resin is mounted and the center of the main antenna 30 formed by the conductive fiber are sealed with the resin 28 (the thermoplastic resin). The resin 28 in this embodiment is not limited to the thermoplastic resin and may also be formed by using the thermosetting resin. When the thermosetting resin is to be used or in like cases, the loop antenna 12 and the main antenna 30 may be collectively arranged at a predetermined position and sealed in a predetermined shape without performing the primary molding of the resin 24.

As described above, in this embodiment, the main antenna 30 is not electrically connected to the loop antenna 12 (spatially apart from each other). However, the main antenna 30 and the loop antenna 12 are located close to each other and electromagnetically coupled. Therefore, the combination of the main antenna 30 and the loop antenna 12 functions as an antenna of the RFID tag. As described above, since the combination functions as the antenna without performing direct electrical connection by providing electrical power by electromagnetic coupling, the possibility of the semiconductor device 20 being destructed due to static electricity is low even when the main antenna 30 made of the conductive fiber is exposed. In this situation, the use of a strong, fireproof, anticorrosive, and flexible conductive fiber such as a SUS metal fine wire, as the main antenna 30, allows an improvement in the environmental resistance performance of the RFID tag when used.

As described later, the RFID tag of this embodiment is used by attaching (fixing) to a fabric such as cloth. Thus, the main antenna 30 formed by the conductive fiber is electromagnetically coupled to the loop antenna 12 without electrical connection. Such a configuration enables the main antenna 30 to be directly attached to a fabric such as cloth to function as an antenna portion without directly contacting with the loop antenna 12 on which the semiconductor device 20 is mounted (spatially apart from each other). Therefore, even when the main antenna 30 of the RFID tag of this embodiment is attached to a fabric, the semiconductor device 20 and the loop antenna 12 are difficult to be destroyed.

Since the main antenna 30 and the loop antenna 12 are spatially apart from each other, the special distance (interval) between them is required to be maintained constant in order to perform a desired electromagnetic coupling. In this embodiment, since the interval between the main antenna 30 and the loop antenna 12 can be maintained constant by collectively sealing (integrally molding) them with the resin 28, a highly-reliable RFID tag can be provided.

Figure 3:
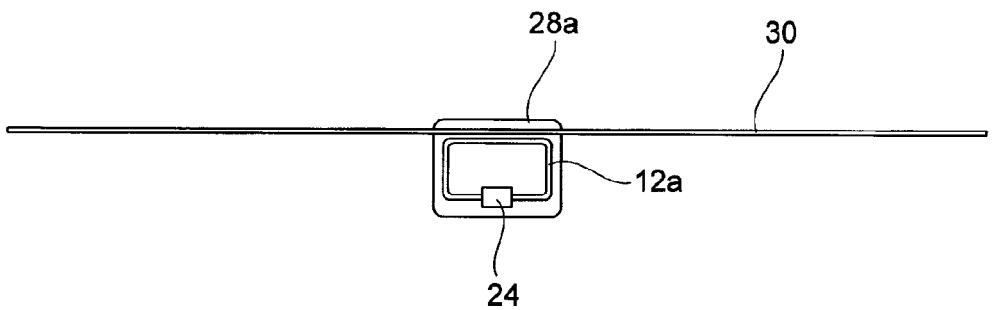
FIG. 3 is a modification of the RFID tag in the first embodiment.

FIG. 3 is a modification of the RFID tag in this embodiment, which illustrates a plan view of the RFID tag. The RFID tag of FIG. 3 includes a rectangular-shaped (quadrilateral) loop antenna 12a instead of the circular-shaped (including an ellipse shape) loop antenna 12 described with reference to FIGS. 1A to 1C and 2A to 2H. This makes a resin 28a which collectively seals the loop antenna 12a and the resin 24 sealing the semiconductor device 20 have a rectangular shape correspondingly. Since the use of the rectangular-shaped loop antenna 12a results in an increase in a region within which the interval between loop antenna 12a and the main antenna 30 is the shortest, a higher-performance RFID tag can be provided. Moreover, such use makes it easier to keep the interval between the loop antenna 12a and the main antenna 30 constant, thereby an RFID tag with stronger electromagnetic-coupling characteristics can be provided.

While the semiconductor device 20 (the resin 24) which is described with reference to FIGS. 2A to 2H is arranged at a position closest to the main antenna 30 in the loop antenna 12, this embodiment is not limited to this. The effect of this embodiment can be obtained also by arranging the semiconductor device 20 (the resin 24) at a position farthest from the main antenna 30 in the loop antenna 12a as illustrated in FIG. 3. In this regard, the same is true in any case of the circular-shaped loop antenna 12 or the rectangular-shaped loop antenna 12a.

Second Embodiment

Next, an RFID tag in the second embodiment of the present invention will be described. FIGS. 4A to 4D are configuration diagrams of the RFID tag in this embodiment. FIG. 4A is a configuration diagram illustrating the inside of the RFID tag, FIG. 4B is a plan view of the RFID tag, FIG. 4C is a diagram illustrating a view as seen from the bottom of FIG. 4B (an elevation view), and FIG. 4D is a diagram illustrating a view as seen from the right side of FIG. 4B (a side view). As illustrated in FIGS. 4A to 4D, the RFID tag of this embodiment is configured such that the semiconductor device 20, as well as the main antenna 30 and the loop antenna 12, are directly and collectively sealed by using the resin 28, which is different from the RFID tag of the first embodiment in which the semiconductor device 20 is sealed with the resin 24 (the primary molding resin) and then collectively sealed with the resin 28 (the secondary molding resin).

FIG. 5 is a modification of the RFID tag in this embodiment. While the semiconductor device 20 which is described with reference to FIGS. 4A to 4D is arranged at a position closest to the main antenna 30 in the loop antenna 12, this embodiment is not limited to this. The effect of this embodiment can be obtained also by arranging the semiconductor device 20 at a position farthest from the main antenna 30 in the loop antenna 12 as illustrated in FIG. 5.

Third Embodiment

Figure 6A:
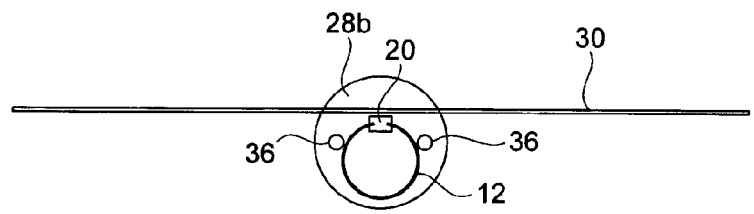
FIGS. 6A to 6D are configuration diagrams of an RFID tag in a third embodiment.
Figure 6B:
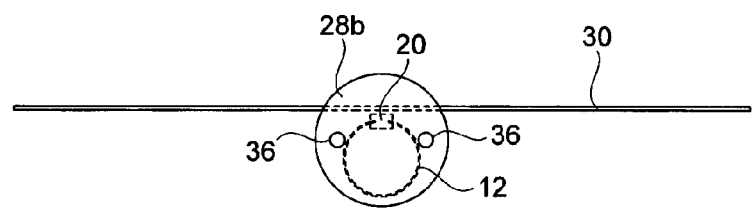
Figure 6D:
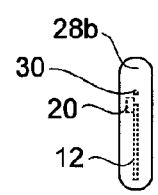
Figure 6C:
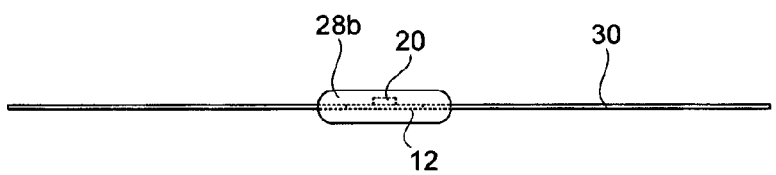

Next, an RFID tag in the third embodiment of the present invention will be described. FIGS. 6A to 6D are configuration diagrams of the RFID tag in this embodiment. FIG. 6A is a configuration diagram illustrating the inside of the RFID tag, FIG. 6B is a plan view of the RFID tag, FIG. 6C is a diagram illustrating a view as seen from the bottom of FIG. 6B (an elevation view), and FIG. 6D is a diagram illustrating a view as seen from the right side of FIG. 6B (a side view). The RFID tag of this embodiment is different from that of the second embodiment in that two through-holes 36 are formed on a resin 28b which collectively seals the main antenna 30, the loop antenna 12, and the semiconductor device 20. The formation of the through-holes on the resin 28b allows the through-holes 36 to be threaded. As a result, the RFID tag can be treated similarly to a fastening button, which makes it possible to easily attach the RFID tag to a fabric such as clothes. The main antenna 30 may be sewed with an embroidery thread on or be bonded by an adhesive on a fabric.

Figure 7:
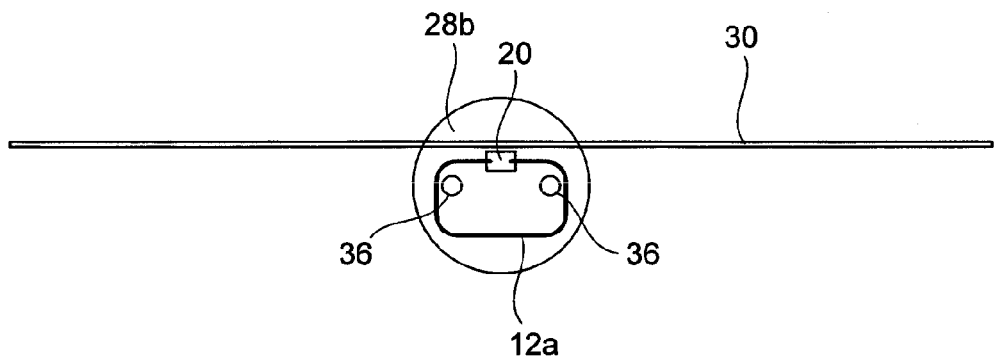
FIG. 7 is a modification of the RFID tag in the third embodiment.

FIG. 7 is a modification of the RFID tag in this embodiment. The RFID tag in FIG. 7 includes a rectangular-shaped (quadrilateral) loop antenna 12a instead of the circular-shaped loop antenna 12 described with reference to FIGS. 6A to 6D. Both the loop antenna 12a and the semiconductor device 20 are collectively sealed by using the resin 28b on which the through-holes 36 are formed. Since the use of the rectangular-shaped loop antenna 12a illustrated in FIG. 7 results in an increase in a region within which the interval between the loop antenna 12a and the main antenna 30 is the shortest, an RFID tag with strong electromagnetic-coupling characteristics can be provided. Moreover, it is easier to keep the interval between the loop antenna 12a and the main antenna 30 constant, thereby an RFID tag with higher reliability can be provided.

Fourth Embodiment

Figure 8A:
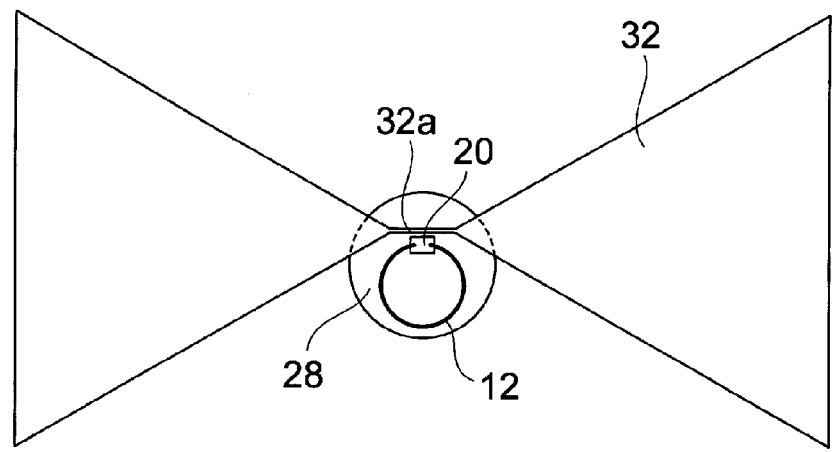
FIGS. 8A and 8B are configuration diagrams of an RFID tag in a fourth embodiment.

Next, an RFID tag in the fourth embodiment of the present invention will be described. FIG. 8A is a cross-sectional view, which is a horizontal slice of a configuration diagram illustrating the inside the RFID tag in this embodiment, and FIG. 8B is a diagram illustrating a view as seen from the bottom of FIG. 8A (an elevation view).

Figure 8B:
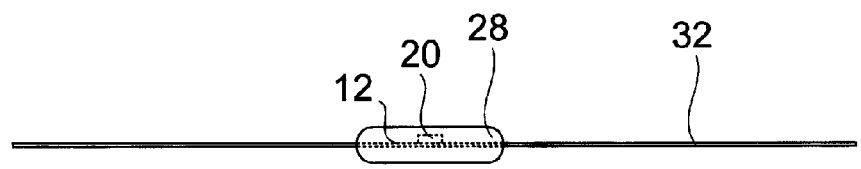

As illustrated in FIGS. 8A and 8B, the RFID tag of this embodiment includes a conductive fabric 32 formed by a conductive fiber. The conductive fabric 32 has an electromagnetic coupling portion 32a arranged near the loop antenna 12 (the semiconductor device 20) and constitutes a main antenna. At least a portion of the conductive fabric 32 (the vicinity of the electromagnetic coupling portion 32a) is sealed with the resin 28 along with the loop antenna 12 and the semiconductor device 20. As described above, the RFID tag of this embodiment is configured by integrally molding the conductive fabric 32 and uses the conductive fabric 32 as the main antenna. In this embodiment, the conductive fabric 32 can be formed into a desired shape by cutting or pressing.

Since the configuration of this embodiment makes it possible to electromagnetically couple the conductive fabric 32 (the electromagnetic coupling portion 32a) and the loop antenna 12 without electrical connection and to keep the distance between the conductive fabric 32 (the electromagnetic coupling portion 32a) and the loop antenna 12 constant, a highly-reliable RFID tag can be provided.

Figure 9:
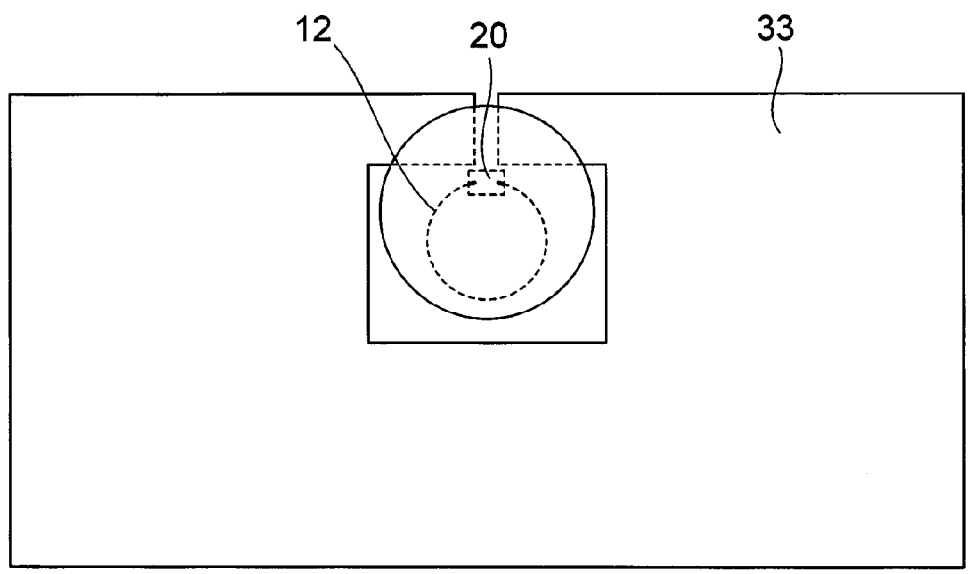
FIG. 9 is a modification of the RFID tag in the fourth embodiment.

FIG. 9 is a modification of the RFID tag in this embodiment. In this modification, a conductive fabric 33 is used instead of the conductive fabric 32. The conductive fabric 33 has an opening portion at the upper side of the drawing (the vicinity of the semiconductor device 20) similarly to the shape of the loop antenna 12. In such a configuration, the effect of this embodiment can be achieved.

Fifth Embodiment

Figure 10A:
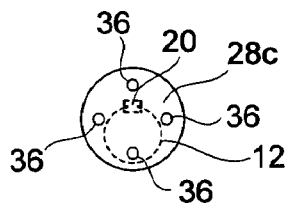
FIGS. 10A to 10I are diagrams illustrating a method of attaching an RFID tag in a fifth embodiment.
Figure 10F:
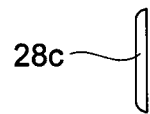
Figure 10B:
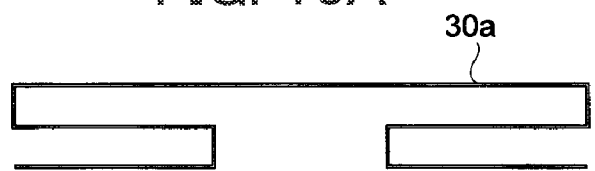
Figure 10G:
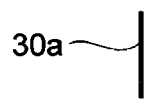
Figure 10C:
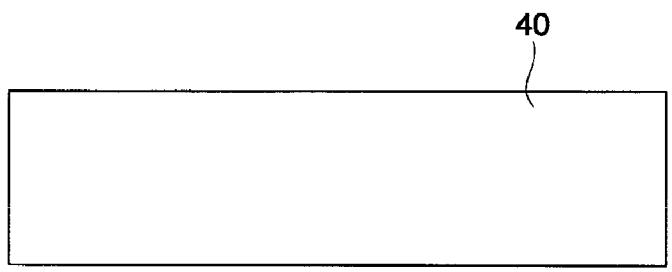
Figure 10H:
Figure 10D:
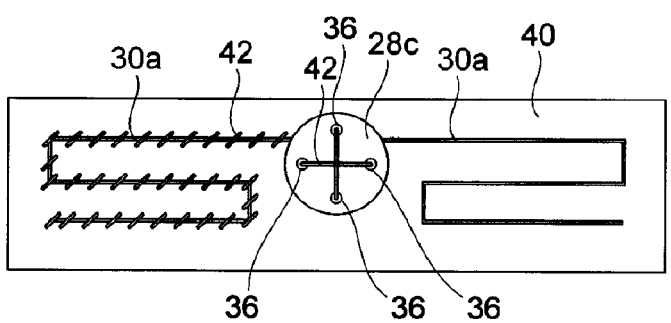
Figure 10I:
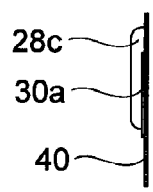
Figure 10E:
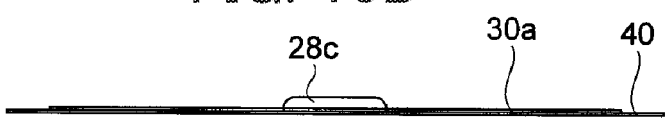

Next, an RFID tag in the fifth embodiment of the present invention will be described. FIGS. 10A to 10I are diagrams illustrating a method of attaching the RFID tag in this embodiment. FIGS. 10A and 10F are a plan view and a side view of the RFID tag, respectively. FIGS. 10B and 10G are a plan view and a side vide of a main antenna 30a formed by a conductive fiber, respectively. FIGS. 10C and 10H are a plan view and a side view of a fabric 40 such as clothes, respectively. FIGS. 10D, 10E, and 10I are a plan view, an elevation view, and a side view, respectively, each of which illustrates a configuration in which the RFID tag is attached to the fabric 40.

As illustrated in FIG. 10A, the semiconductor device and the loop antenna are integrally molded with a resin 28c on which four through-holes 36 are formed, and included in the resin 28c, constituting a button-shaped component. As illustrated in FIG. 10B, the main antenna 30a of this embodiment has a plurality of bent portions. This embodiment, however, is not limited to this and a linear-shaped main antenna may also be employed. The main antenna 30a illustrated in FIGS. 10B and 10G is separately formed from the RFID tag illustrated in FIGS. 10A and 10F.

As illustrated in FIG. 10D, the button-shaped component is attached on the fabric 40 by passing a thread 42 through the through holes 36. As illustrated at the left side of FIG. 10D, the main antenna 30a can be attached on the fabric 40 by sewing with an antenna thread itself of 30a or embroidery using the thread 42. Alternatively, as illustrated in the right side of FIG. 10D, the main antenna 30a may be bonded on the fabric 40 by using an adhesive (without using the thread 42).

In this embodiment, the main antenna 30a formed by the conductive fiber may be formed by using (together with) a warp or a weft constituting the fabric 40 when the fabric 40 is made, and then the button-shaped component in FIGS. 10A and 10(f) may be sewed. Alternatively, the main antenna 30a may be attached to a back side of the fabric 40 (the opposite side of the attachment surface of a RFID resin molded product (a resin 28c)). Eventually, the loop antenna and the main antenna 30a in the button-shaped component are electromagnetically coupled and function as the RFID tag.

Figure 11A:
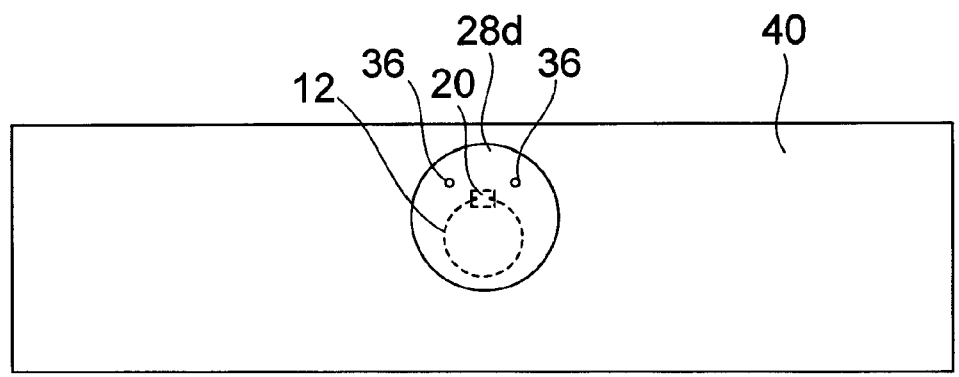
FIGS. 11A to 11C are a modification of the RFID tag in the fifth embodiment.
Figure 11B:
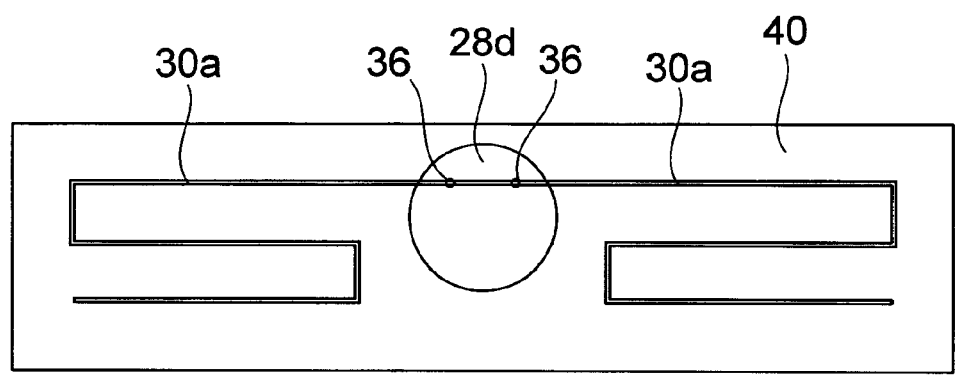
Figure 11C:
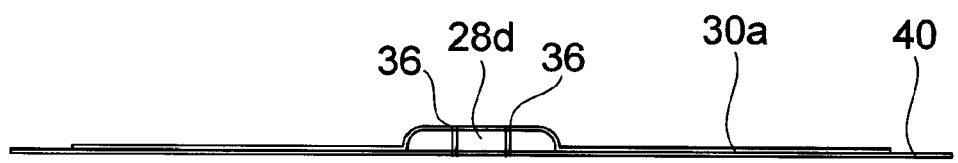

FIGS. 11A to 11C are modification of the RFID tag in this embodiment. FIG. 11A is a plan view illustrating a state in which a resin molded product (a resin 28d) is merely placed on the fabric 40 separately provided, FIG. 11B is a plan view illustrating a state in which the resin molded product is sewed on the fabric 40 by the main antenna 30a itself or is attached by an adhesive, and FIG. 11C is a diagram illustrating a view as seen from the bottom of FIG. 11B (an elevation view). Although, in FIG. 11C, the main antenna 30a is depicted on the upper surface of the fabric 40, the main antenna 30a is exposed also to the lower side when the main antenna 30a is sewed by a conductive fabric serving as a thread. The drawing is a schematic illustration.

As illustrated in FIG. 11A, the RFID tag of this modification includes the resin 28d (the resin molded product including the semiconductor device and the loop antenna) on which two through-holes 36 (button holes) are formed. This resin molded product is placed at a predetermined position on the fabric 40 and then, as illustrated in FIGS. 11B and 11C, sewed by using the main antenna 30a formed by a conductive fiber (a sewing thread). As described above, in this modification, the loop antenna 12 and the semiconductor device 20 are collectively sealed by using the resin 28d while forming the through-holes 36. Then, the conductive fiber is threaded through the through-holes 36 to fix the resin 28d to the fabric 40, thereby forming the main antenna 30a electromagnetically coupled with the loop antenna 12.

In this modification, the main antenna 30a (the conductive fiber) is constituted by the sewing thread, and the resin molded product is attached to the fabric 40 by using the main antenna 30a itself. In this case, the through-holes 36 are formed at predetermined positions of the resin 28d such that the main antenna 30a sewing the fabric 40 is electromagnetically coupled with the loop antenna 12. This makes it possible to keep the interval between the loop antenna 12 and the main antenna 30a constant easily. Moreover, this embodiment can offer enhanced privacy protection because the loop antenna and the main antenna are separated and thus a communication distance performance is lost when the RFID resin molded product (the button) is removed.

Sixth Embodiment

Next, an RFID tag in the sixth embodiment of the present invention will be described. FIGS. 12A to 12H are configuration diagrams of the RFID tag in this embodiment, which illustrates a manufacturing process of the RFID tag. FIG. 12A is a plan view of the main antenna 30, FIG. 12B is a plan view of the fabric 40, and FIG. 12C is a plan view of the loop antenna 12 and the semiconductor device mounted thereon. First, in this embodiment, each component which is illustrated in FIGS. 12A to 12C is prepared.

Subsequently, as illustrated in FIGS. 12D and 12E, the loop antenna 12 on which the semiconductor device 20 is mounted is placed on the surface (one surface) of the fabric 40 and the main antenna 30 formed by the conductive fiber is placed on the back surface (the other surface) of the fabric 40. FIG. 12D is a plan view illustrating this state and FIG. 12E is a side view thereof.

Subsequently, as illustrated in FIGS. 12F to 12H, the loop antenna 12 and the semiconductor device 20 are collectively sealed (integrally molded) with the resin 28. In this situation, a part of the fabric 40 is also sealed with the resin 28. FIG. 12F is a plan view of the RFID tag in this state, FIG. 12G is an elevation view thereof, and FIG. 12H is a side view thereof. The integral molding by the resin 28 is performed by clamping each component which is illustrated in FIGS. 12D and 12E with a mold (not illustrated in the drawings).

As described above, in this embodiment, the RFID tag in which the RFID resin molded product is integrated with the fabric 40 by molding the resin 28 can be provided.

FIGS. 13A and 13B are a modification of the RFID tag in this embodiment. FIG. 13A is a plan view of the RFID tag and FIG. 13B is a side view thereof. In this modification, the RFID resin molded product (the resin 28) is treated as a button (an RFID button), a predetermined mark 45 (in this embodiment, the letters "APICYAMADA") is embroidered on the fabric 40 near the RFID resin molded product, and a logo mark 47 (in this embodiment, the letter "Y") is provided on the RFID resin molded product. In addition, as illustrated in FIG. 14, the mark 45 can be configured to function as the main antenna 30 (or the main antenna can be configured to function as the mark) by embroidering the predetermined mark 45 (e.g. the letters "Apic yamada" which are written unicursally) on the fabric 40 with the use of a conductive fiber thread (a sewing thread) instead of a linear-shaped main antenna 30.

Seventh Embodiment

Figure 15A:
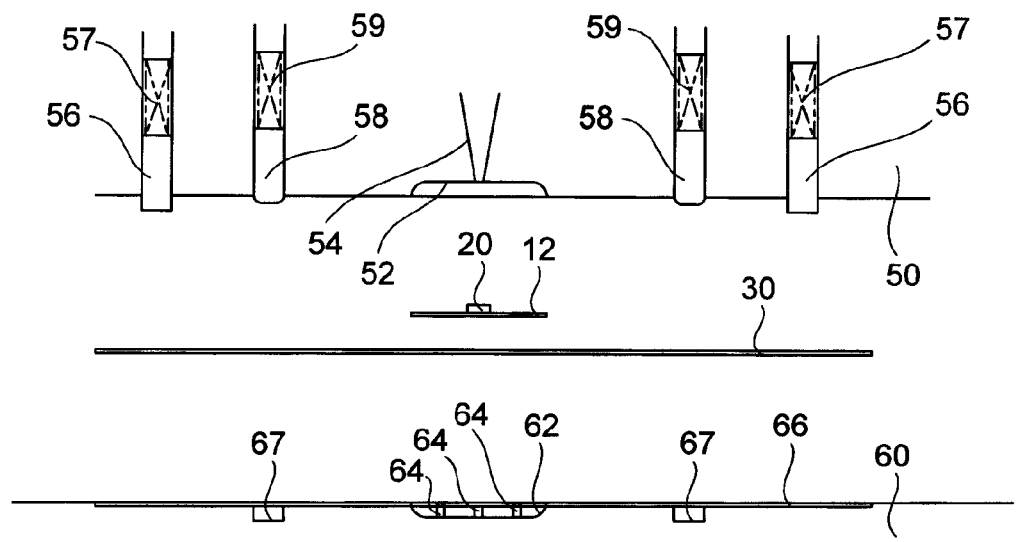
FIGS. 15A and 15B are manufacturing process diagrams of an RFID tag using a mold in a seventh embodiment.
Figure 15B:
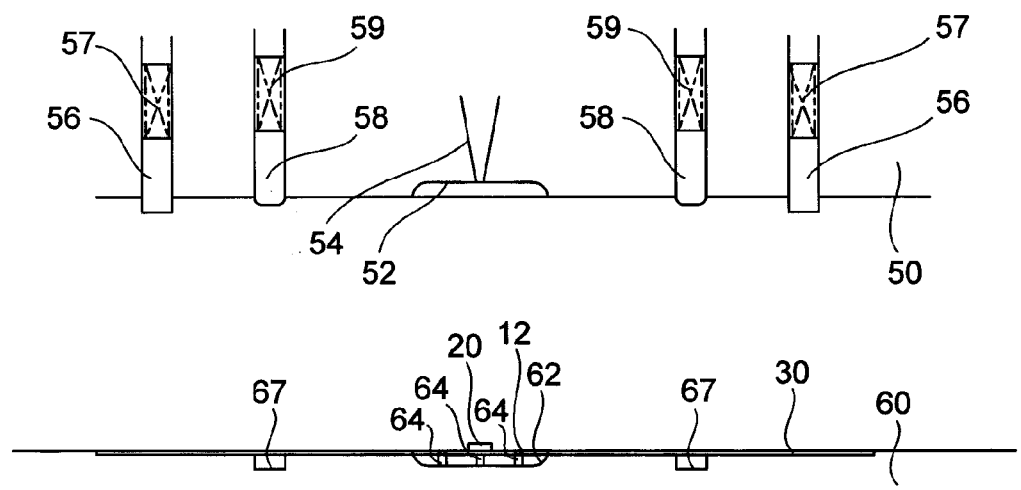

Next, a method of manufacturing the RFID tag (a method of molding a resin) and a mold to be used in molding the RFID tag with the resin in the seventh embodiment of the present invention will be described. FIGS. 15A and 15B and FIGS. 16A to 16D are manufacturing process diagrams of the RFID tag molded using the mold in this embodiment. FIGS. 15A and 15B are cross-sectional views of the mold which is not clamped. FIGS. 15A and 15B illustrate a state in which both of a first mold 50 and a second mold 60 are separated from the main antenna 30 (a "mold-opened state") and a state in which the main antenna 30 is placed on the second mold 60 (a "mold-set state"), respectively. FIGS. 16A to 16D are cross-sectional views during a clamping process and after the completion of the clamping. FIGS. 16A, 16B, 16C, and 16D illustrate a state in which the main antenna is clamped with clamp blocks, a state in which the mold is further closed and the main antenna is pressed with tension blocks into a concave groove formed on the second mold to apply a tension, a state during the resin sealing (an "injection-started state"), and a state in which the resin sealing is completed (a "filled state"), respectively.

The mold of this embodiment mainly includes the first mold 50 and the second mold 60. The resin sealing of this embodiment is performed by injection molding of the resin 28 with respect to the loop antenna 12 on which the semiconductor device 20 is mounted (or a structure in which the semiconductor device 20 and a part of the loop antenna 12 are covered with the resin 24) with the use of the first mold 50 and the second mold 60. As illustrated in FIGS. 15A and 15B, the first mold 50 and the second mold 60 include cavities 52 and 62 (concave portions) respectively, for forming an external shape of a package of the RFID tag. The resin 28 is injection-molded into these cavities.

The first mold 50 is provided with a sprue 54 for injecting the resin 28. While, in this embodiment, the thermoplastic resin is used as the resin 28, applicable materials are not limited to this and may be other resins such as an elastic elastomer resin. Alternatively, the sealing may be performed by a transfer molding or compression molding with the thermosetting resin.

In addition, the first mold 50 is provided with clamp blocks 56 and tension blocks 58. The clamp blocks 56 are configured to clamp the main antenna 30 formed by the conductive fiber. Therefore, the clamp blocks 56 are biased by a spring 57 in a downward direction in FIG. 15A. The tension blocks 58 are configured to press the main antenna 30 into a concave groove 67 provided in the second mold 60 which is described later to apply a tension. Therefore, the tension blocks 58 are biased by the spring 57 in the downward direction in FIG. 15A.

The second mold 60 includes movable pins 64 (movable portions) which align the external shape of the package of the RFID tag, the loop antenna 12, and the main antenna 30 of the RFID tag such that they are located in a desirable position relation (a position relation in a package thickness direction or a package main surface direction). As described above, the resin 28 is sealed by being clamped with the mold including the movable pins 64 which align the main antenna 30, the loop antenna 12, and the semiconductor device 20. In this embodiment, the details of the movable pins 64 will be described later.

On the second mold 60, a concave portion 66 on which the main antenna 30 is to be placed is formed. The concave portion 66 has a shape and a size (a length) corresponding to the main antenna 30 and, as illustrated in FIG. 15B, is configured such that the main antenna 30 can be placed thereon. Furthermore, on the second mold 60, concave grooves 67 are formed. The concave grooves 67 are provided at positions corresponding to the tension blocks 58 of the first mold 50 and configured such that the tension blocks 58 are pressed (inserted) thereinto.

Figure 16A:
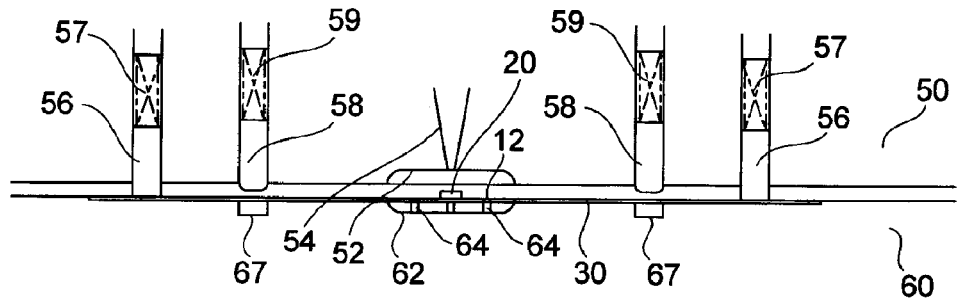
FIGS. 16A to 16D are manufacturing process diagrams of the RFID tag using the mold in the seventh embodiment.

As illustrated in FIG. 16A, when the resin sealing is performed, both of the main antenna 30 and the loop antenna 12 on which the semiconductor device 20 is mounted (a loop antenna assembly) are clamped by using the first mold 50 and the second mold 60. The first mold 50 provided with the sprue 54 presses the main antenna 30 and the loop antenna 12 from a first surface side (the mounting surface side of the semiconductor device 20). The second mold 60 presses the main antenna 30 and the loop antenna 12 from a second surface side opposite to the first surface. At the point in time illustrated in FIG. 16A, the main antenna 30 is pressed by the clamp blocks 56, and the tension blocks 58 do not contact the main antenna 30. At this time, the main antenna 30 and the loop antenna 12 are supported by the movable pins 64 (the movable portions) and also are aligned by the movable pins 64. However, when a configuration is adopted in which a tension is applied to the main antenna 30 by the tension blocks 58, the movable pins 64 for supporting the main antenna 30 do not need to be used. The method of applying the tension is not limited to this and, for example, a tension control unit which is provided outside the mold may be used.

Figure 16B:
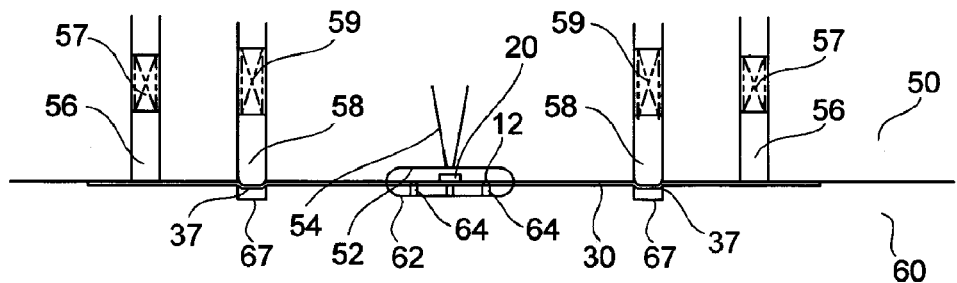

Subsequently, as illustrated in FIG. 16B, when the first mold 50 is further pressed down, the tension blocks 58 of the first mold 50 are pushed into the concave grooves 67 of the second mold 60 (mold closing). At this time, block contact portions 37 of the main antenna 30 are pushed by the tension blocks 58 into the concave grooves 67, thereby the tension is applied to the main antenna 30. At this time, the first mold 50 and the second mold 60 fully clamp the main antenna 30, causing the cavities 52 and 62 to form a space which determines a shape of the RFID resin molded product (the resin 28).

Figure 16C:
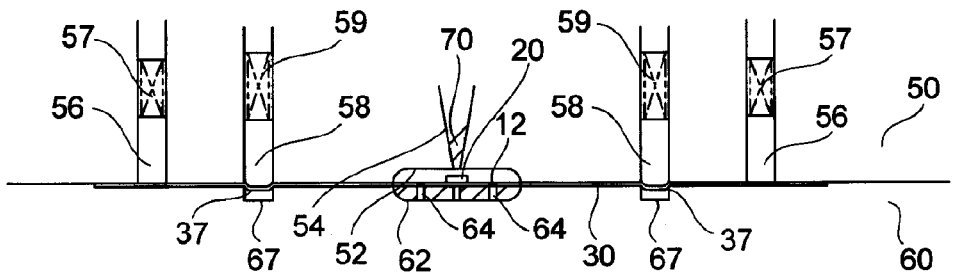

Subsequently, as illustrated in FIG. 16C, a molten resin 29 is supplied into the cavities 52 and 62 from the sprue 54 provided on the first mold 50. Thus, the molten resin 29 is injection-molded from one side. In this situation, when a predetermined amount of the molten resin 29 is filled into the cavities 52 and 62 (for example, when approximately a half of each cavity is filled with the molten resin 29), the movable pins 64 supporting the main antenna 30 and the loop antenna 12 retract downward (move to retract from the inside of the cavity 62). As described above, the movable pins 64 of this embodiment are configured to move depending on an amount of the resin filled into the cavities. On the other hand, the main antenna 30 and the loop antenna 12 are supported by the molten resin 29 to keep the positions determined by the movable pins 64 because approximately a half of the inside of each cavity is filled with the molten resin 29.

Figure 16D:
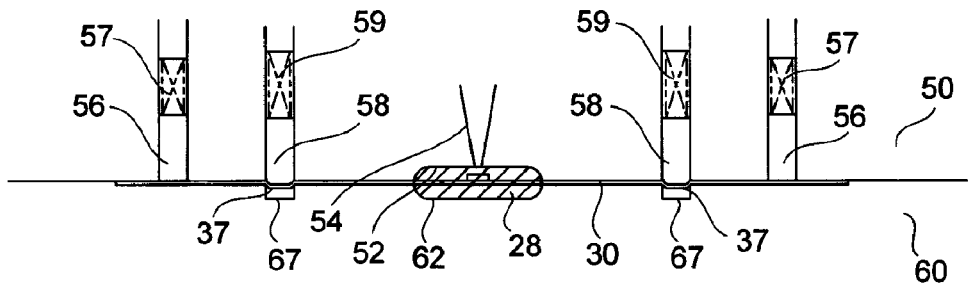

As illustrated in FIG. 16D, when the inside of the cavities 52 and 62 is fully filled with the molten resin 29, the resin sealing completes. At this point, the resin 28 having an external shape corresponding to the cavities 52 and 62 is formed because the movable pins 64 have retracted from the inside of the cavities.

Figure 17A:
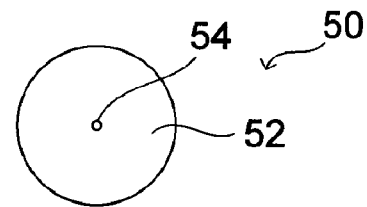
FIGS. 17A to 17D are configuration diagrams of the mold in the seventh embodiment.
Figure 17B:
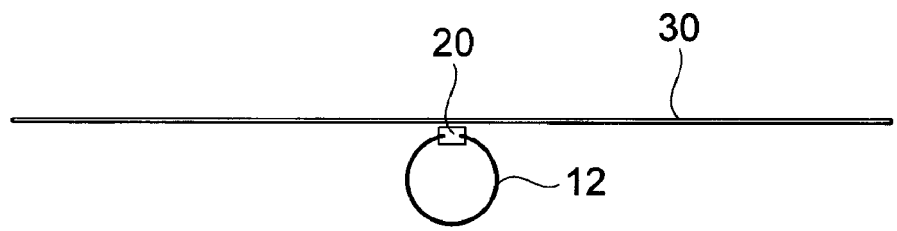
Figure 17C:
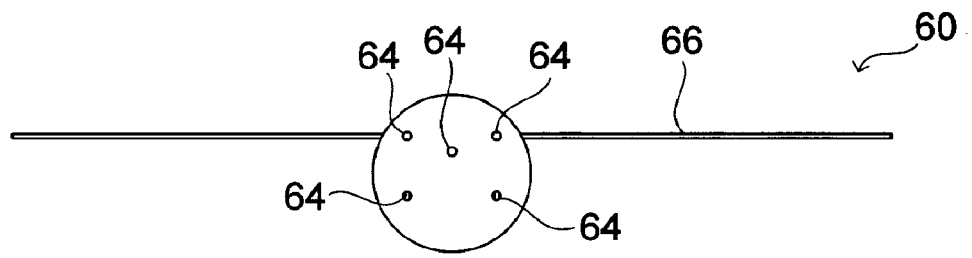
Figure 17D:
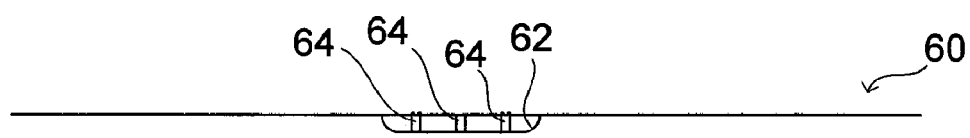

FIGS. 17A to 17D are configuration diagrams of the mold in this embodiment. FIG. 17A is a plan view of the first mold 50, FIG. 17B illustrates the RFID tag structure which is not sealed with the resin (the main antenna 30 and the loop antenna 12 on which the semiconductor device 20 is mounted), FIG. 17C is a plan view of the second mold 60, and FIG. 17D is a cross-sectional view of the second mold 60. As illustrated in FIG. 17A, the cavity 52 (the concave portion) constituting the external shape of the molded resin is formed on the first mold 50 and the sprue 54 for supplying the molten resin 29 is formed inside the cavity 52.

As illustrated in FIG. 17C, on the second mold 60, the cavity 62 (the concave portion) constituting the external shape of the molded resin is formed. Inside the cavity 62, the five movable pins 64 are provided. As illustrated in FIG. 17B, the RFID tag structure of this embodiment includes the main antenna 30 formed by the conductive fiber. Therefore, the mold (the second mold 60) of this embodiment needs to clamp the main antenna 30 in addition to the loop antenna 12 on which the semiconductor device 20 is mounted. Since the main antenna is not necessarily required to be clamped, the clamping may not be performed in some molding conditions. Accordingly, the second mold 60 is provided with a concave portion 66 to place (house) the main antenna 30.

Figure 18A:
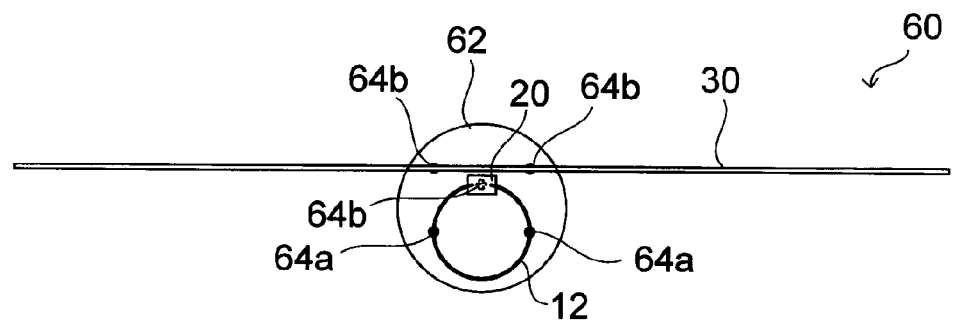
FIGS. 18A and 18B are diagrams illustrating a state in which an RFID tag structure that is not sealed with a resin is placed on the mold (a second mold) in the seventh embodiment.
Figure 18B:
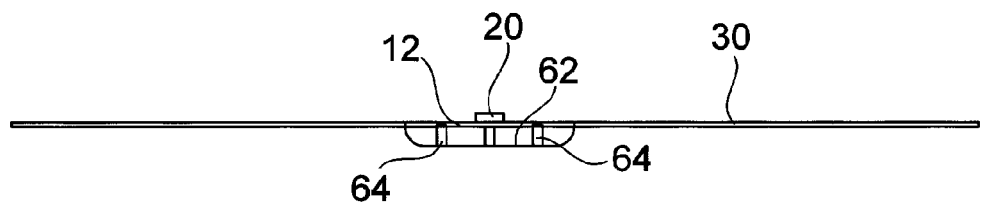

FIGS. 18A and 18B are diagrams illustrating a state in which the RFID tag structure which is not sealed with the resin is set on the mold (the second mold 60) in this embodiment. FIG. 18A is a plan view of the second mold 60 and FIG. 18B is a cross-sectional view thereof, respectively. As illustrated in FIG. 18A, when the RFID tag structure is placed on the second mold 60, the loop antenna 12 is supported by two movable pins 64a, the main antenna 30 is supported by two movable pins 64b, and the semiconductor device 20 is supported by a movable pin 64c. As mentioned above, the movable pins 64 (64a, 64b, and 64c) move during the resin sealing to retract from the inside of the cavities. Since the clamp 64b of the main antenna is not necessarily required to be clamped, the clamping may not be performed in some molding conditions. This makes it possible to align the main antenna 30 and the loop antenna 12 on which the semiconductor device 20 is mounted while supporting them without affecting the external shape of the molded resin (the external shape of the package), which enables the manufacturing of a highly-reliable RFID tag. While a total of five movable pins are used in this embodiment, the number thereof is not limited to this. The number and the positions of various types of movable pins can be changed as appropriate.

Figure 19A:
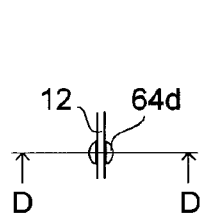
FIGS. 19A to 19F are diagrams illustrating variations of a movable pin in the seventh embodiment.
Figure 19B:
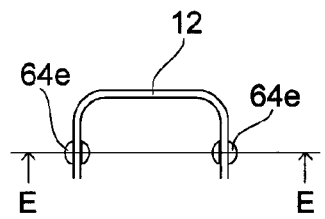
Figure 19C:
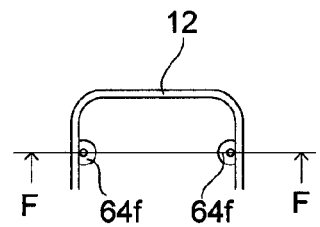
Figure 19D:
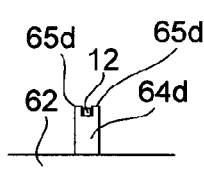
Figure 19E:
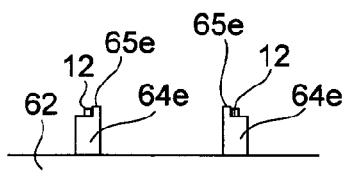
Figure 19F:
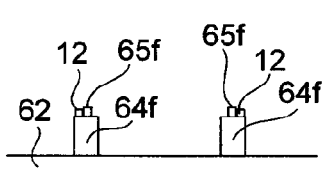

FIGS. 19A to 19F illustrates a variation of the movable pins in this embodiment. FIGS. 19A to 19C are plan views of movable pins 64d to 64f whose types are different from each other and FIGS. 19D to 19F are cross-sectional views in D-D, E-E, and F-F sections of the movable pins 64d to 64f of FIGS. 19A to 19C, respectively.

The movable pin 64d illustrated in FIGS. 19A and 19D is a movable pin (a U-shaped pin) including convex portions 65d on its both sides (including concave portions with convex portions 65d (wall surfaces) on their both sides). Since the loop antenna 12 is supported by being housed in the concave portions of the movable pin 64d, its movement is limited. Movable pins 64e illustrated in FIGS. 19B and 19E are movable pins (one-side-convex pins), each having a convex portion 65e only on the inner side of the loop antenna 12. The movement of the loop antenna 12 is limited by the convex portions 65e. Movable pins 64f illustrated in FIGS. 19C and 19F are movable pins (center-convex pins), each having a protrusion portion 65f on its center portion. The movement of the loop antenna 12 is limited by the convex portion 65f of each movable pin 64f.

Figure 20:
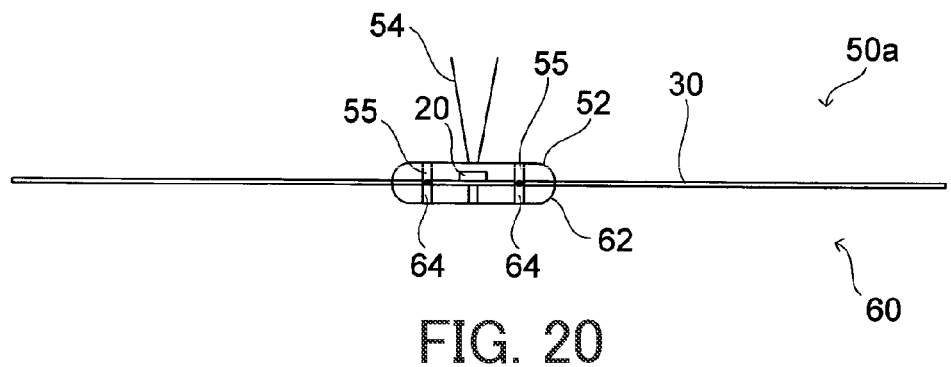
FIG. 20 is a modification of the mold (the movable pin) in the seventh embodiment.

FIG. 20 illustrates a modification of the mold (the movable pins) in this embodiment. In this modification, the second mold 60 is provided with the movable pins 64 and also the first mold 50a is provided with movable pins 55. When a predetermined amount of the molten resin is filled into the cavities, the movable pins 55 moves downward (retracts). Such a configuration causes the loop antenna 12 to be held by the movable pins 64 and 55 on its both sides. In addition, the movable pins may be provided so as also to hold the main antenna 30 or the semiconductor device 20 on its both sides. This modification enables resin sealing with higher stability and reliability by providing the movable pins on the both sides.

Eighth Embodiment

Figure 21A:
FIGS. 21A to 21C are configuration diagrams of an RFID tag in an eighth embodiment.
Figure 21B:
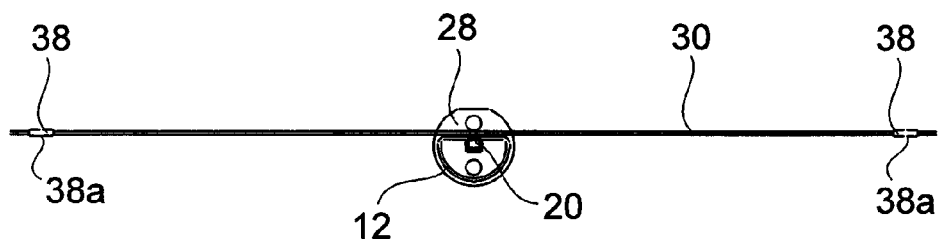
Figure 21C:
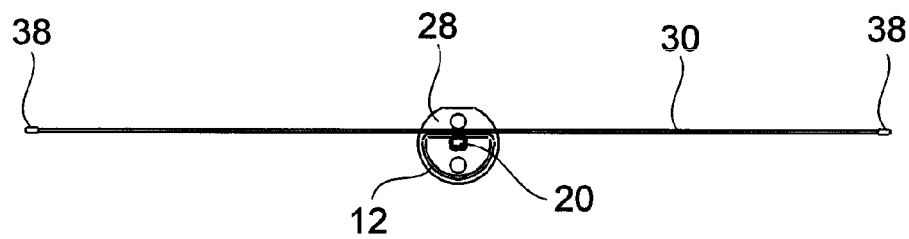

Next, the RFID tag in the eighth embodiment of the present invention will be described. FIGS. 21A to 21C are configuration diagrams of the RFID tag in this embodiment, FIG. 21A is an enlarged sectional view of a resin 38 molded at a predetermined position on the main antenna 30, FIG. 21B is an overall view of the RFID tag, and FIG. 21C is a configuration diagram of the RFID tag cut at a cut position on the resin 38. The RFID tag of this embodiment has an overall configuration illustrated in FIG. 21B. Since this state is a state in which a plurality of RFID tag structures are connected, the plurality of RFID tag structures are required to be individually separated. The RFID tag structures are not necessarily required to be connected in plural number and each may be an individual piece. This separation is performed by cutting them at concave portions of the resins 38 molded on the main antenna 30.

As illustrated in FIG. 21A, at predetermined positions (cut positions) of the main antenna 30, the resins 38 are molded. At the center portions of the resins 38, concave portions 38a are formed such that the main antenna 30 (the resins 38) is cut at the concave portions 38a. After the cutting, connected structures (a plurality of RFID tags) in FIG. 21B are individually separated as illustrated in FIG. 21C. At the cut end portions (both ends) of the main antenna 30, the resins 38 are formed.

The configuration of this embodiment makes it possible to prevent fraying of the main antenna 30 because the resin 38 is formed on the main antenna 30 (the conductive fiber). A significant fraying of the main antenna 30 at the time of the cutting makes the appearance of the main antenna 30 bad, thereby requiring a certain amount of time when attaching the RFID tag to an object. Therefore, this embodiment can provide an RFID tag easily attachable to an object. The length of the main antenna 30 is an important factor to have a high-performance antenna function. Thus, the molding of the resin 38 on the main antenna 30 causes the resin 38 to function as a mark, which makes it possible to provide an RFID tag having a uniform and high-performance antenna function.

Figure 22A:
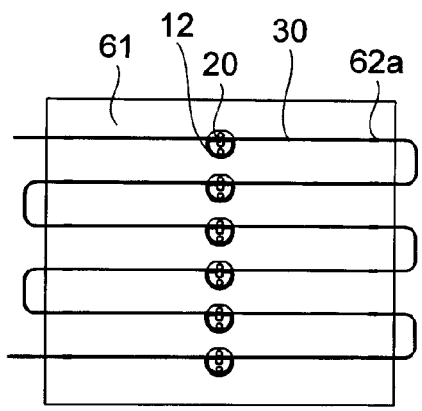
FIGS. 22A to 22C are configuration diagrams of a mold in the eighth embodiment.
Figure 22B:
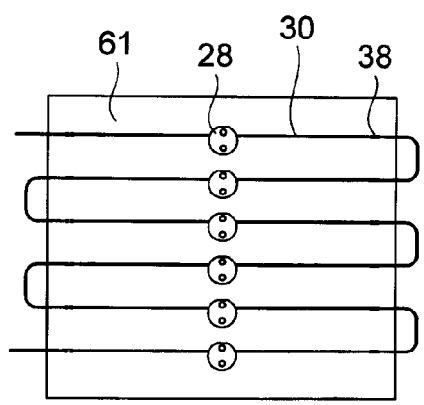
Figure 22C:
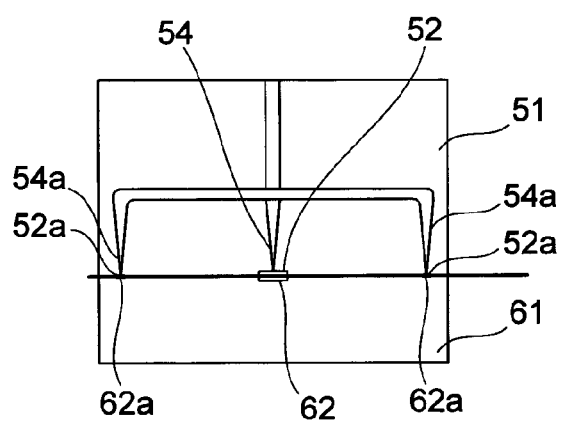

FIGS. 22A to 22C are configuration diagrams of a mold to be used for molding the RFID tag of this embodiment. FIGS. 22A and 22B are plan views of the mold (the second mold), which illustrate states in which the RFID tag observed before and after the resin sealing is performed, respectively. FIG. 22C is a cross-sectional view of the mold (a first mold 51 and a second mold 61).

Figure 23:
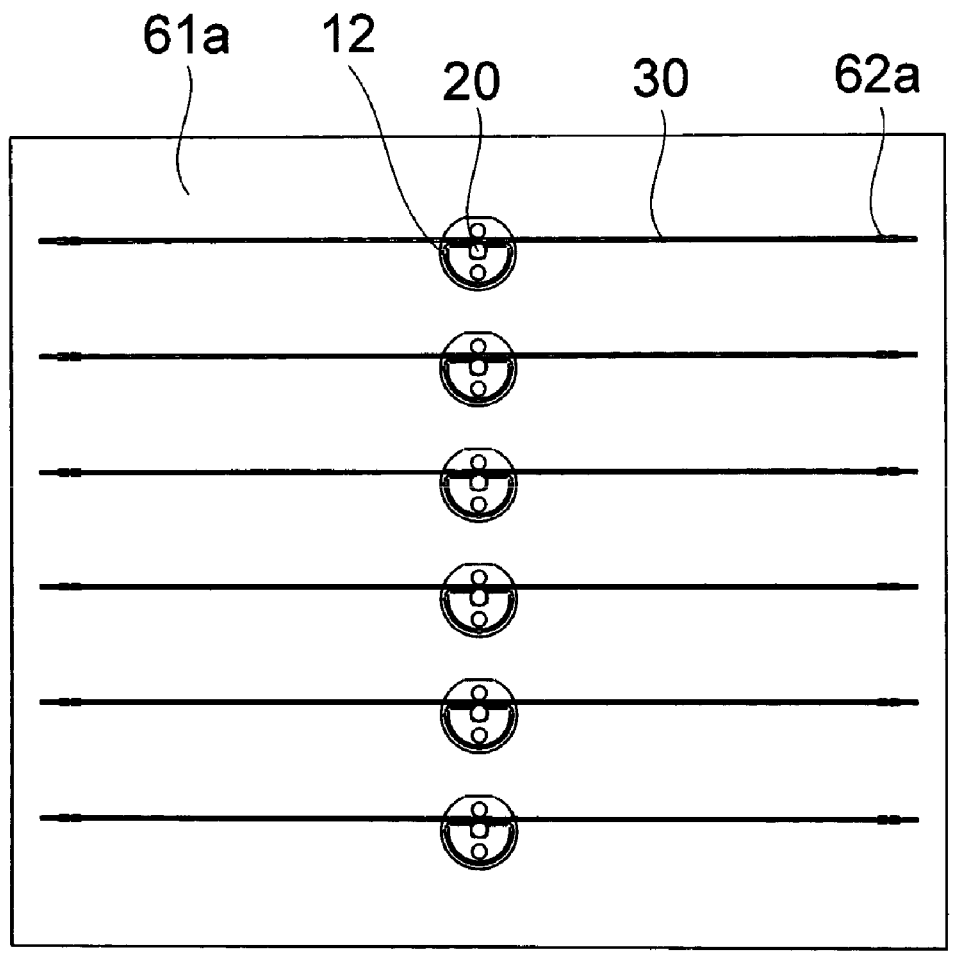
FIG. 23 is a modification of the mold in the eighth embodiment.

As illustrated in FIGS. 22A to 22C, the mold (the first mold 51 and the second mold 61) of this embodiment is configured to be able to seal a plurality of (six) RFID tags at the same time with resin. The number of the RFID tags capable of being sealed with the resin at the same time is not limited to this. The main antennas 30 formed by the conductive fiber are connected and cavities 52a and 62a (concave portions) for molding the resin 38 are provided at predetermined positions (cut portions) when the resin molding is performed (at the time of setting the RFID tag structure). An injection of the resin from the sprues 54 and 54a toward the cavities 52, 62, 52a, and 62a with the RFID tag structure being clamped by using the first mold 51 and the second mold 61 causes the cavities 52, 62, 52a, and 62a to be filled with the resins 28 and 38. This embodiment, however, is not limited to this and applicable also to a case where the main antennas 30 of the plurality of RFID tags are separated from each other (a case where the adjacent main antennas 30 are not connected to each other) by using a mold (a second mold 61a) illustrated in FIG. 23.

Each of the embodiments described above makes it possible to perform highly-reliable resin molding for the RFID tag structure (the main antenna, the loop antenna, and the semiconductor device) with it being in a stably-fixed state while protecting it from resin molding pressure. Therefore, a highly-reliable RFID tag which does not give a user a feeling of strangeness even when contacting his/her body and is firmly attachable to a fabric such as clothes, a method of manufacturing the RFID tag, and a mold which is used for manufacturing the RFID tag can be provided.

The embodiments of the present invention have been described in detail above. The present invention, however, is not limited to the embodiments described above and can be modified as appropriate without deviating from the spirit of the present invention.

Figure 24:
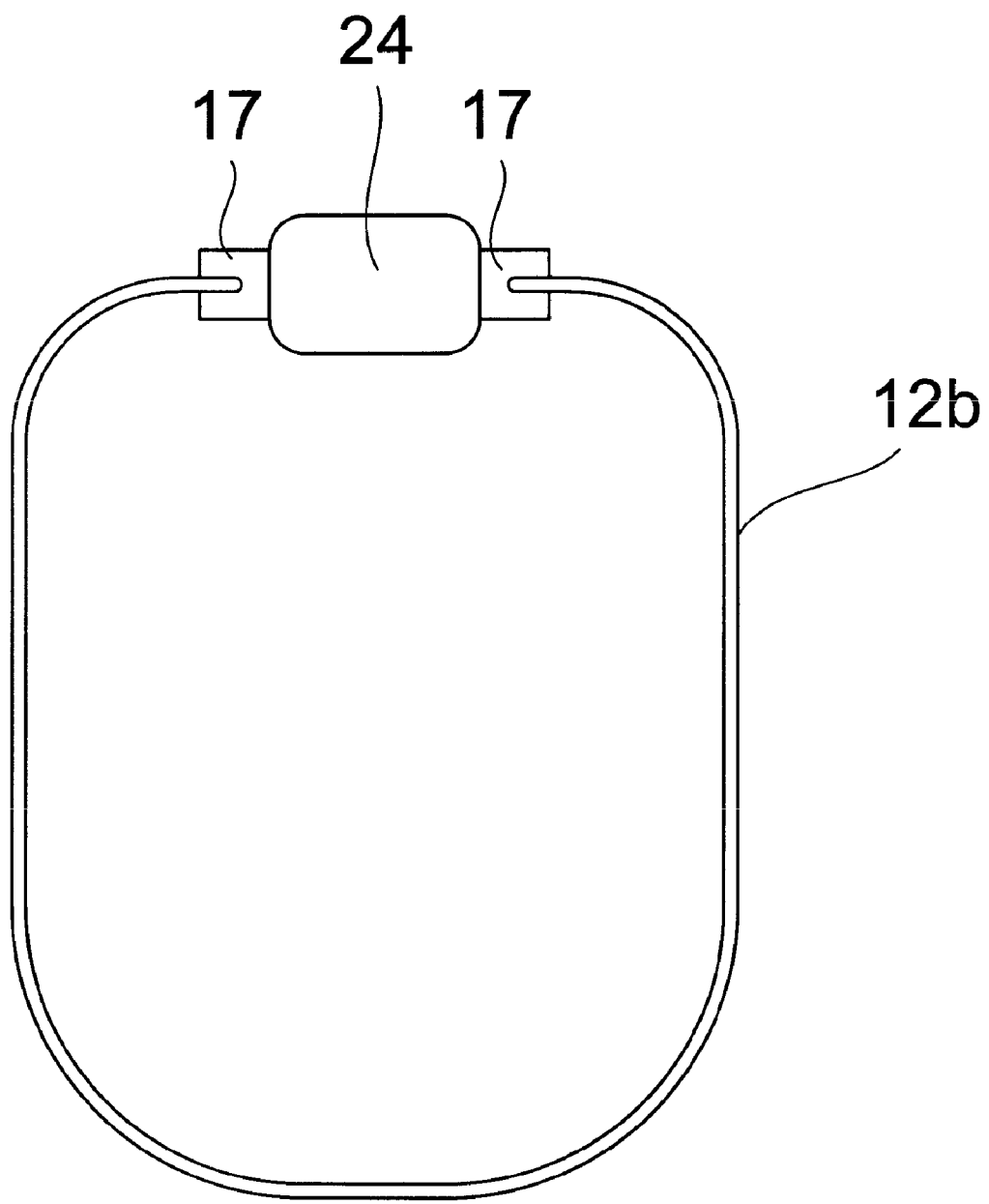
FIG. 24 illustrates an example of a loop antenna which is formed by a conductive fiber in each of embodiments.

For instance, the main antenna and the loop antenna are not necessarily required to be electromagnetically coupled and only have to be indirectly electrically coupled without physically and directly conductive connection even in the case of electric field coupling, dielectric coupling, magnetic coupling, or electromagnetic coupling. While the loop antenna is formed by the sheet metal in this embodiment, it may be formed by a conductive fiber similarly to the main antenna as illustrated in FIG. 24. In this case, a metal plate 17 for connection is used to weld both ends of a loop antenna 12b formed by the conductive fiber on the metal plate 17. Furthermore, the resin 24 (the thermosetting resin) sealing the semiconductor device 20 is mounted on the metal plate 17 to be electrically connected with the loop antenna 12b.

Figure 25A:
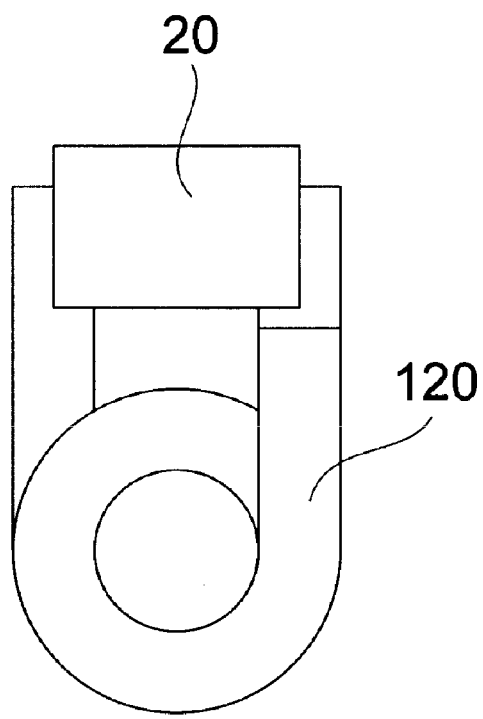
FIGS. 25A and 25B are diagrams illustrating a loop antenna which is constituted by an edgewise coil in each of embodiments.
Figure 25B:
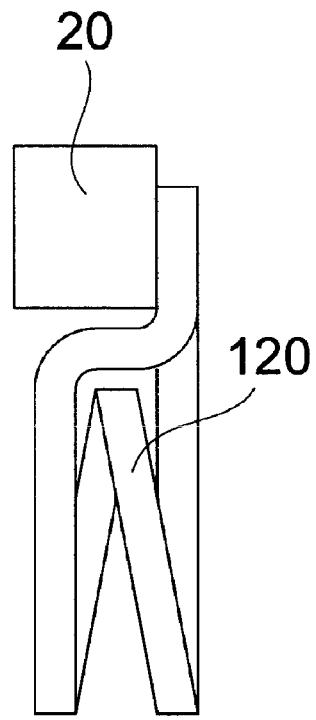

Alternatively, as illustrated in FIGS. 25A and 25B (a plan view of FIG. 25A and a side view of FIG. 25B) and described in the first embodiment, the loop antenna may be formed by an edgewise coil 120 (a metal coil loop).

REFERENCE SIGNS LIST

10 METAL STRIP
12 LOOP ANTENNA
16 TERMINAL
20 SEMICONDUCTOR DEVICE
24, 28, 38 RESIN
30 MAIN ANTENNA
32 CONDUCTIVE FABRIC
36 THROUGH-HOLE
40 FABRIC
50, 51 FIRST MOLD
52, 62 CAVITY
54 SPRUE
56 CLAMP BLOCK
58 TENSION BLOCK
60, 61 SECOND MOLD
64 MOVABLE PIN
120 EDGEWISE COIL

The invention claimed is:

1. An RFID tag for wireless communications, comprising:
   a conductive fiber main antenna including a conductive fiber;
   a sheet metal loop antenna electrically coupled to the main antenna without a direct conductive connection;
   a semiconductor device electrically connected to a terminal of the sheet metal loop antenna; and
   a resin collectively sealing a part of the main antenna, the sheet metal loop antenna, and the semiconductor device.

2. The RFID tag according to claim 1, wherein the resin is formed by clamping the part of the main antenna and the sheet metal loop antenna with a mold including a movable portion which aligns the main antenna with the loop antenna.

3. The RFID tag according to claim 1, wherein the conductive fiber of the main antenna is a stranded wire or a single wire.

4. The RFID tag according to claim 1, wherein the semiconductor device is a bare chip.

5. The RFID tag according to claim 1, wherein the semiconductor device is a semiconductor package configured by sealing a bare chip with a resin.

6. The RFID tag according to claim 1, wherein the sheet metal loop antenna is a coil loop.

7. The RFID tag according to claim 1, wherein the semiconductor device is provided at one of a position closest to the main antenna and a position farthest from the main antenna of the sheet metal loop antenna.

8. The RFID tag according to claim 1, wherein the conductive fiber of the main antenna is a conductive fabric.

9. The RFID tag according to claim 1, wherein the resin defines a through-hole.

10. The RFID tag according to claim 1, wherein the sheet metal loop antenna has a circular shape or a rectangular shape.

11. The RFID tag according to claim 1, wherein the resin is formed on an end portion of the main antenna.

12. A method of manufacturing an RFID tag for wireless communications, the method comprising the steps of:
    forming a sheet metal loop antenna;
    mounting a semiconductor device on a terminal of the sheet metal loop antenna to be electrically connected;
    arranging a conductive fiber main antenna and the sheet metal loop antenna so that the main antenna is electrically coupled to the sheet metal loop antenna without direct conductive connection; and
    sealing a part of the main antenna, the sheet metal loop antenna, and the semiconductor device collectively with a resin.

13. The method of manufacturing the RFID tag according to claim 12, wherein the resin is formed by clamping the part of the main antenna and the sheet metal loop antenna with a mold including a movable portion which aligns the main antenna with the sheet metal loop antenna.

14. The method of manufacturing the RFID tag according to claim 12, further comprising the step of:
    sealing the semiconductor device and at least a part of the sheet metal loop antenna with the resin after mounting the semiconductor device on the sheet metal loop antenna.

15. The method of manufacturing the RFID tag according to claim 12, wherein when sealing the part of the main antenna, the sheet metal loop antenna, and the semiconductor device collectively with the resin, a through-hole to be threaded is formed on the resin.

16. The method of manufacturing the RFID tag according to claim 12, wherein:
    when sealing the part of the main antenna, the sheet metal loop antenna, and the semiconductor device collectively with the resin, the resin is formed on a predetermined position of the main antenna, and
    the main antenna is cut at the predetermined position so that the RFID tag is individually separated.

17. A method of manufacturing an RFID tag for wireless communications, the method comprising the steps of:
    forming a sheet metal loop antenna;
    mounting a semiconductor device on a terminal of the sheet metal loop antenna such that the semiconductor device and the sheet metal loop antenna are electrically connected;
    sealing the sheet metal loop antenna and the semiconductor device collectively with a resin while forming a through-hole; and
    passing a conductive fiber through the through-hole to fix the resin on a fabric so as to form a main antenna electrically coupled to the sheet metal loop antenna without direct conductive connection.

18. The method of manufacturing the RFID tag according to claim 17, wherein the main antenna formed by the conductive fiber passes through the through-hole to fix the resin on the fabric so that the conductive fiber functions as a mark.

19. A mold which is used for manufacturing an RFID tag, the mold comprising:
- a first mold configured to press a main antenna formed by a conductive fiber and a sheet metal loop antenna mounting a semiconductor device from a first surface side; and
- a second mold configured to press the main antenna and the sheet metal loop antenna from a second surface side opposite to the first surface, wherein:
- each of the first mold and the second mold includes a cavity and is configured to clamp the main antenna and the sheet metal loop antenna to perform injection molding of a resin inside the cavity,
- at least one of the cavities of the first mold and the second mold is includes a movable portion configured to align a part of the main antenna with the sheet metal loop antenna and support the part of the main antenna and the sheet metal loop antenna, and the movable portion is configured to move depending on an amount of the resin filled inside the cavity.

20. The mold according to claim 19, wherein:
the first mold and the second mold are configured so that a plurality of RFID tags are sealed with the resin simultaneously, and
the first mold and the second mold have a concave portion to form the resin at a cutting position of the main antenna.

* * * * *

UNITED STATES PATENT AND TRADEMARK OFFICE
CERTIFICATE OF CORRECTION

| | | |
|---|---|---|
| PATENT NO. | : 9,129,203 B2 | Page 1 of 1 |
| APPLICATION NO. | : 14/345919 | |
| DATED | : September 8, 2015 | |
| INVENTOR(S) | : Fumihito Ishida et al. | |

It is certified that error appears in the above-identified patent and that said Letters Patent is hereby corrected as shown below:

In the Claims

Column 17, line 15:

delete "is"

Signed and Sealed this
Sixteenth Day of February, 2016

Michelle K. Lee
*Director of the United States Patent and Trademark Office*